(12) United States Patent
Vincent

(10) Patent No.: US 6,911,931 B2
(45) Date of Patent: Jun. 28, 2005

(54) USING DYNAMIC INTERFEROMETRIC SYNTHETIC APERATURE RADAR (INSAR) TO IMAGE FAST-MOVING SURFACE WAVES

(75) Inventor: Paul Vincent, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/690,355

(22) Filed: Oct. 20, 2003

(65) Prior Publication Data
US 2004/0090360 A1 May 13, 2004

Related U.S. Application Data
(60) Provisional application No. 60/421,423, filed on Oct. 24, 2002.

(51) Int. Cl.[7] .............................................. G01S 13/90
(52) U.S. Cl. ................. 342/25 C; 342/22; 342/25 R; 342/25 A; 342/147; 342/156; 342/175; 342/176; 342/179; 342/190; 342/191; 342/195
(58) Field of Search ............................. 342/22, 25, 26, 342/27, 28, 147, 156, 175, 176, 179, 180, 190, 191, 192–197, 25 R–25 F, 26 R–26 D, 104–117, 118, 134–146

(56) References Cited

U.S. PATENT DOCUMENTS

| 4,975,704 | A |   | 12/1990 | Gabriel et al. | |
|---|---|---|---|---|---|
| 5,463,397 | A |   | 10/1995 | Frankot | |
| 5,488,374 | A | * | 1/1996 | Frankot et al. | 342/25 |
| 5,659,318 | A | * | 8/1997 | Madsen et al. | 342/25 |
| 5,677,693 | A |   | 10/1997 | Frankot et al. | |
| 5,726,656 | A | * | 3/1998 | Frankot | 342/25 |
| 5,945,937 | A |   | 8/1999 | Fujimura | |
| 6,097,328 | A |   | 8/2000 | Frankot | |
| 6,150,972 | A | * | 11/2000 | Bickel et al. | 342/25 |
| 6,181,270 | B1 | * | 1/2001 | Dwyer | 342/25 |
| 6,452,532 | B1 | * | 9/2002 | Grisham | 342/25 |

FOREIGN PATENT DOCUMENTS

EP          0654681 B1    8/1999

OTHER PUBLICATIONS

R.M. Goldstein & H.A. Zebker, Interferometric radar measurement of ocean surface currents. Nature, vol. 328, Aug. 20, 1987, pp. 707–709.

Richard E. Carande, Estimating Ocean Coherence Time Using Dual–Baseline Interferometric Synthetic Aperture Radar. IEEE Transactions on Geoscience and Remote Sensing, vol. 32, No. 4, Jul. 1994.

* cited by examiner

Primary Examiner—Bernarr E. Gregory
(74) Attorney, Agent, or Firm—Michael C. Staggs; Alan H. Thompson

(57) ABSTRACT

A new differential technique and system for imaging dynamic (fast moving) surface waves using Dynamic Interferometric Synthetic Aperture Radar (InSAR) is introduced. This differential technique and system can sample the fast-moving surface displacement waves from a plurality of moving platform positions in either a repeat-pass single-antenna or a single-pass mode having a single-antenna dual-phase receiver or having dual physically separate antennas, and reconstruct a plurality of phase differentials from a plurality of platform positions to produce a series of desired interferometric images of the fast moving waves.

43 Claims, 4 Drawing Sheets

USING DYNAMIC INTERFEROMETRIC SYNTHETIC APERATURE RADAR (INSAR) TO IMAGE FAST-MOVING SURFACE WAVES

RELATED APPLICATION

This application claims the benefit of U.S. Provisional Application No. 60/421,423, filed Oct. 24, 2002, and entitled, "Using Interferometric Synthetic Aperature Radar (InSAR) To Image Seismic Surface Waves," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to synthetic aperture radar (SAR). More particularly, the invention relates to a sampling method and apparatus for imaging fast-moving surface displacements in real time, such as seismic waves, utilizing both single-pass and repeat-pass synthetic aperture radar interferometry (InSAR).

2. State of Technology

Seismology plays a dominant role in monitoring global natural (e.g., earthquakes) and man-made activity (e.g., underground mining). Seismology, however, is an inherently blind methodology, whereby the seismic waves are recorded by the effect they have on instruments as the seismic waves pass by. In addition, the type and quality of information available from seismology has been and continues to be limited by the relatively sparse spatial sampling on the earth's land surface and nearly complete lack of spatial sampling over the oceans. If these dynamic waves can be imaged in real time, actual movies of these waves can be produced yielding more information about their source and the structure they propagate through.

InSAR (Interferometric Synthetic Aperture Radar) is a new geodetic standard providing spatially continuous maps of surface displacements to the millimeter level, with 25-meter horizontal (pixel) resolution. Operational benefits of InSAR include all weather, day or night, spatially continuous, wide area (100 by 100 km image frames) and global coverage from space. While InSAR has predominantly been used to map and measure static deformations, the possibility exists for applying InSAR techniques to image dynamic deformations, such as those from seismic waves propagating along the earth's surface.

Three typical ways of acquiring InSAR data are: 1) cross-track single pass (dual antenna), 2) cross-track repeat pass (single antenna), and 3) along-track single pass (dual antenna). The single-pass methods require two SAR antennas mounted on the same platform for simultaneous acquisition. The repeat-pass method requires only one antenna that acquires data over the same area twice via a repeat pass, but with a slightly different viewing geometry. This approach requires precise knowledge and predictability of the flight path and hence it is best suited to space-borne systems.

Along-track interferometry (ATI), which is applicable to the remote measurement of velocities of objects moving on the ground, images a ground region twice at slightly different times by producing two SAR images. The movement of the measured object in the images, e.g., water currents, causes a phase shift between the corresponding pixels in the SAR images. The moving surface produces a Doppler shift relative to the other stationary ground pixels,. A Doppler image can thus be created whereby only moving objects are visible in the image. Measurements from an inertial navigation system may be used to correct for unwanted phase shifts caused by aircraft yaw, pitch and roll. While a SAR is usually operated as a single-channel SAR, its antenna may be divided in the direction of movement and operated as a two-channel ATI SAR (i.e., an along-track interferometer).

Background information on a single SAR line utilizing a single pass is disclosed in U.S. Pat. No. 5,945,937, titled "ALONG-TRACK INTERFEROMETRIC SYNTHETIC APERTURE RADAR," issued Aug. 31, 1999, to Fujimura, including the following: "An along-track interferometric SAR of the present invention includes a single SAR channel for acquiring SAR data by observing a target only once. A reconstructing section reconstructs two SAR images deviated in time from the SAR data to thereby output two reconstructed SAR images. A detecting section calculates a phase difference between the two reconstructed SAR images to thereby detect the velocity of the target in the SAR eye direction. The reconstructing section bisects, based on the fact that the frequency of a wave returned from the ground undergoes a Doppler shift due to the movement of a SAR relative to the ground, the SAR data in the frequency domain and processes the bisected SAR data."

Despite existing conventional systems and methods, a need exists for an improved dynamic InSAR for real time assessment of surface displacements, such as, but not limited to, seismic waves. The present system and method is directed to such a need.

SUMMARY OF THE INVENTION

Accordingly, the present invention provides a Dynamic InSAR imaging method that includes sampling fast-moving surface displacement waves from a plurality of moving platform positions and reconstructing a plurality of phase differentials from the plurality of platform positions to produce a series of interferometric images of said waves.

Another aspect of the present invention provides a Dynamic InSAR imaging method that includes sampling fast-moving surface displacement waves from a plurality of moving platform positions and subtracting a phase difference from phase centers having a time lag $t_{lag}$ at each of the platform positions. A plurality of phase differentials from the plurality of platform positions thus produces a series of interferometric images of the fast-moving surface displacement waves.

Another aspect of the present invention provides a Dynamic InSAR imaging method that includes sampling fast-moving surface displacement waves from a plurality of moving platform positions and subtracting a phase difference between corresponding antenna formed from offset phase centers having a time lag $t_{lag}$ at each of the platform positions. A plurality of phase differentials from the plurality of platform positions thus produces a series of interferometric images having one or more sets of concentric rings associated with the fast-moving surface displacement waves.

A further aspect of the present invention provides an InSAR apparatus that is arranged as a dual phase-center antenna allowing for a phase center offset for imaging fast-moving surface waves.

Accordingly, the present invention provides an InSAR method and system that provides real time velocity assessment of fast moving surface displacements of greater than about 100 m/sec, more often between about 300 and about 8,000 m/sec. Applications include, but are not limited to, earthquake rupture physics, volcano harmonic tremor source characterization, open ocean tsunami tracking and early warning, and detection/monitoring of damage assessment of surface and underground activity in military and non-military events, such as, explosions (e.g., mining).

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
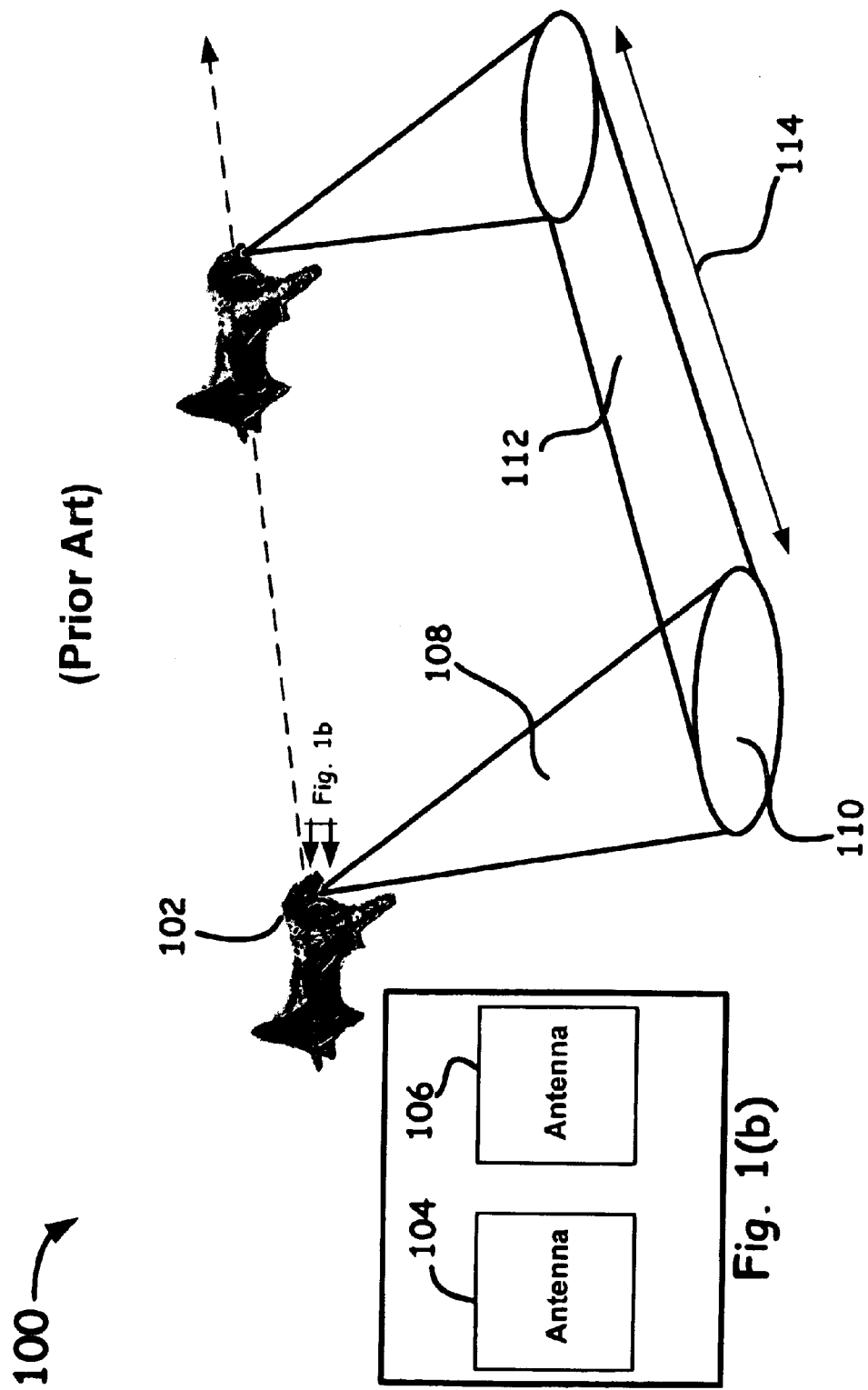
FIG. 1(a) illustrates an InSAR Strip-map mode geometry.
FIG. 1(b) illustrates a simplified schematic of two SAR images formed from two physically separate antennas or a single antenna having two channel feeds.

Referring now to the following detailed information, and to incorporated materials; a detailed description of the invention, including specific embodiments, is presented.

Unless otherwise indicated, numbers expressing quantities of ingredients, constituents, reaction conditions and so forth used in the specification and claims are to be understood as being modified by the term "about". Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

General Description

Conventional Interferometric Synthetic Aperture Radars (InSARs) are well understood and extensively used in static mode for imaging static deformations associated with earthquake rupture, fault creep, volcanic deflation, and other static deformations from remote targets, but their extension to real-time dynamic imaging mode, to image surface displacements produced from, for example, seismic waves from earthquakes, explosions, volcanic generated harmonic tremors to pinpoint magma and gas movement, Tsunamis, storm surges, and oil slick real-time tracking, have not been developed. In addition, imaging man-made explosions can lead to the detection and characterization of underground bunkers and cavities, which has many military uses. The major technical challenges include the need to observe small amplitude surface oscillations (often only about 1 cm) that are moving fast (greater than about 100 m per second). To form such images, any InSAR platform, such as a satellite, or a jet aircraft, must fly in a straight line or smooth arc. If not, deviations from a straight line or arc must be measured precisely and compensated for during processing (e.g., motion compensation).

The present invention, Dynamic Interferometric Synthetic Aperture Radar (Dynamic InSAR) is analogous to "Along-track" InSAR (discussed herein before, and thus far used exclusively to measure relatively slow-moving water current waves), but incorporates a sampling method and an improved single antenna design that can form real-time images and measure fast-moving surface waves on water (Tsunamis) and land (seismic surface waves). Such a system and method can operate in the repeat-pass mode or single-pass mode (also discussed above) and within the microwave frequency range from about 1 mm to about 1 m. Often the present invention operates in predetermined frequency bands, such as C-band, e.g., between about 2.5 and about 3.5 cm, L-band, e.g., between about 15 and about 30 cm, and S-band e.g., between about 8 and about 15 cm. More often the present invention beneficially operates within X-frequency band, for example, between about 2.5 and about 3.5 cm.

Specific Descriptions

InSAR Geometry

The present invention can operate in a Strip-map mode. In such a mode, an antenna pointing direction is kept fixed while image data are collected. A time window over which back-scattered radiation is collected using a series of pulses from an illuminated target area determines the length of the strip. The collected radiation is processed and an accumulation of data is used to construct a synthesized image of a target area. To form images, the platform is required to fly in a straight line or arc, or, if not, deviations from a straight line or arc require corrections during processing.

FIG. 1(a) illustrates such a concept and is designated by the reference numeral 100. A single antenna (not shown), capable of being divided into a pair of channels, or two physically separate antennas 104, and 106, as shown respectively in FIG. 1(b) can be mounted, for example, along the front fuselage of a moving airborne platform 102, such as an aerial jet aircraft, or it can be installed on a space platform such as a satellite, to form an "Along-Track InSAR", as discussed above. Each single antenna (not shown) or if arranged as a pair of antennas 104, 106, as shown in FIG. 1(b), is capable of measuring a series of return phases for each illumination pulse (illustrated as an illumination source beam 108). A beam footprint 110 approximately equal to λR/d (with λ as the illumination wavelength, R is the range to target, and d is the length or diameter of the antenna), is created by beam 108 and carried along a strip 112 having a length 114. Each pulse is emitted as a chirp function (a pulse with a linearly-varying frequency), and reflections from the pulse are received back at the antenna and sampled and combined with a replica of the outgoing pulse function. Each pulse thus forms one line of along-track SAR image data. When multiple pulses are received one after the other in the along-track direction, a 2-dimensional SAR image can be formed. Two such SAR images thus formed from similar viewing geometries can be combined interferometrically to create an interferometric phase map of the ground region. Instruments such as gyroscopes can be used to keep the pointing of illumination beam 108 stable.

In another mode of operation, the present invention is capable of being operated in Spotlight InSAR, which includes imaging a target by directing an antenna at the center of the imaging scene during the entire pass of a space or an airborne platform to provide a longer illumination time, (i.e., a spotlight aperture).

Such a similar architecture and method is described in a textbook by Fitch, J. P., *Synthetic Aperture Radar*, Springer-Verlag New York Inc., 1988. p. 125–128. TK 6592. S95F58.

Figure 2:
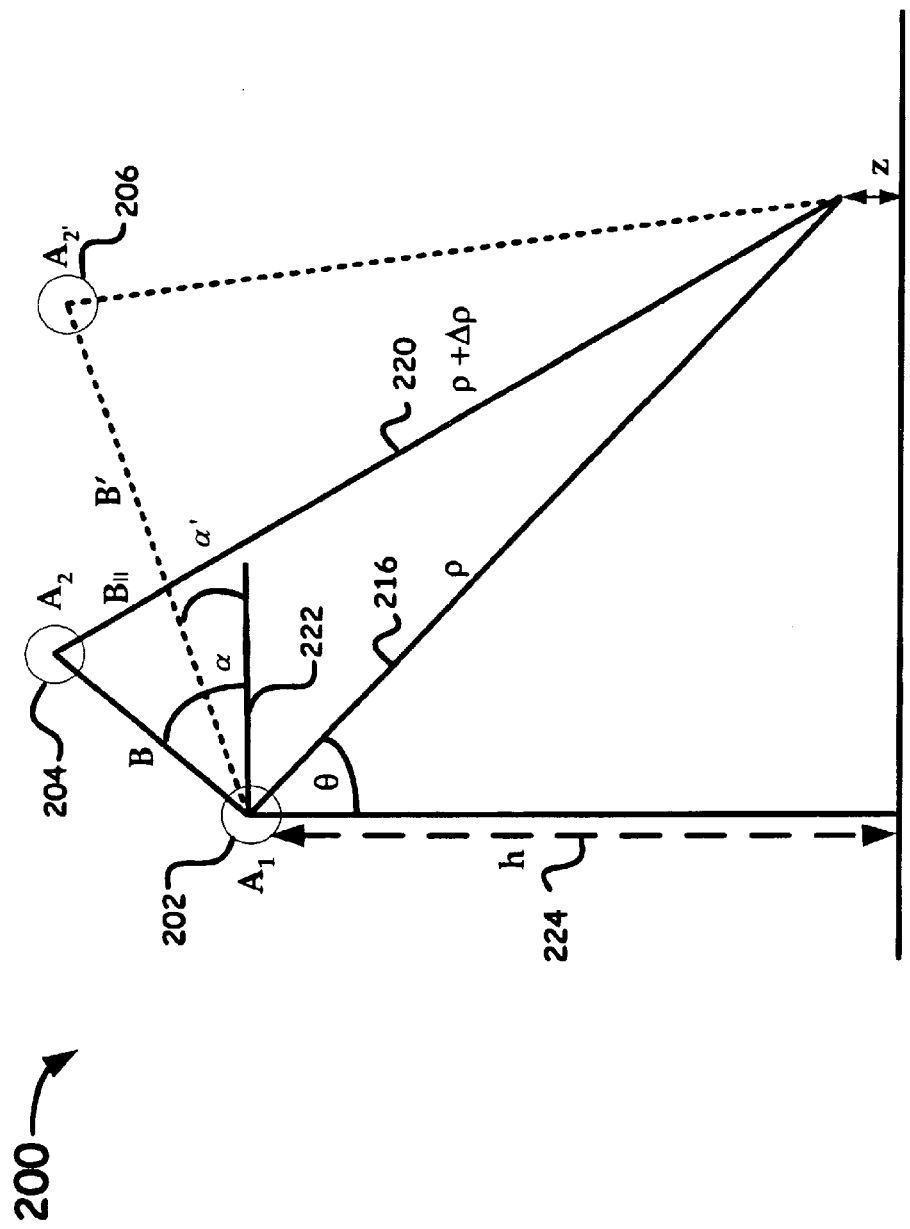
FIG. 2 shows the general geometry for InSAR.

FIG. 2 illustrates the general InSAR geometry as designated by the reference numeral 200 for cross-track, static InSAR. Two separate passes of the same antenna, or two different antennas (from two different satellites) are denoted as imaging positions $A_1$ 202, and $A_2$ 204. The distance between imaging positions is called the interferometric baseline and is denoted as B. For Dynamic InSAR, the imaging positions are offset along the flight path (into the page—not shown) but is still referred to as the baseline and denoted as the letter B. Similarly a single antenna (not shown) with dual phase centers offset along the flight track (azimuth), forms the "Along-Track Interferometer" with phase center offset in the flight direction and referred to as the baseline B. In any case, a pair of slant ranges ($\rho$) 216 and ($\rho+\Delta\rho$) 220 to the same surface element at (z) is measured. A look angle $\theta$ (the angle with respect to vertical downward) and a flying height 224 (h) geometry are fixed with $\alpha$ and $\alpha'$ being the angle of baselines B and B' with respect to a horizontal 222. Dashed lines show paths for a second interferogram pair (of the same site formed by antenna $A_1$ 202 and $A_2'$ 206) for collecting unperturbed topographic phase to be removed from the dynamic (seismic wave) collection pair. The path of a moving aircraft or satellite is into the page.

The measured phase at each point of the two radar images is the sum of a propagation part (proportional to the round-trip distance to the on the ground ) and a scattering part due to the interaction of a radar wave with the ground. If the two path lengths are $\rho$ and $\delta\rho$, the phase difference $\phi$ is:

$$\phi = \frac{4\pi}{\lambda}\Delta\rho. \qquad 1.$$

or $2\pi/\lambda$ times the round trip distance difference.
Using the law of cosines and approximations, $\Delta\rho$ can be shown as:

$$\Delta\rho \sim B_\parallel. \qquad 2.$$

With $B_\parallel = B \sin(\theta-\alpha)$ being the component of the baseline parallel to the look direction. Combining equations (1) and (2) results in:

$$\phi = \frac{4\pi}{\lambda}B\|; \qquad 3.$$

which depends on $\theta$, which in turn depends on topography.

If a second interferogram (denoted by primes and dashed lines) is acquired over the same area so that $\theta$ and $\rho$ are unchanged, the phases of the two interferograms can be compared to obtain:

$$\phi/\phi' = B\|/B\|'. \qquad 4.$$

The ratio of the phases of the two interferograms is equal to the ratio of the parallel components of the baselines, independent of topography.

If a surface displacement occurs, such as, for example, because of an earthquake, a volcanic eruption, or man-made explosions, such that each resolution element (pixel) has been displaced between observations, the correlated radar echoes of the present invention can observe such displacements.

In addition to the phase dependence on topography, there is also a phase change due to the radar line of sight component of the displacement $\Delta\rho$. If the displacement occurs in the primed interferogram, the phase $\phi'$ is:

$$\phi'=(4\pi/\lambda)(B\|'+\Delta\rho). \qquad 5.$$

If the data from the initial unprimed interferogram are scaled by the ratio of the parallel components of the baseline and subtracted from the primed interferogram, then:

$$\phi' - (B\|'/B\|)\phi = \frac{4\pi}{\lambda}\Delta\rho. \qquad 6.$$

Now $B\|'/B\|=B' \sin(\theta-\alpha')/B \sin(\theta-\alpha)$ depends on both the illumination geometry as well as the topography at each point in the radar image. To evaluate equation (6), the topography $\theta$ is subtracted out by using a digital elevation (DEM) map of the image area or alternatively, the topography can be subtracted out by using the inteferograms themselves.

The relative sensitivity of the phase measurement to topography and displacement can be found by taking the derivative of equation (5) with respect to z, as shown in FIG. 2, with z=h-$\rho$ cos $\theta$, for topography and with respect to $\Delta\rho$ for displacement.

Using dz=$\rho$ sin $\theta d\theta$, the derivative of equation (5) with respect to topography is:

$$d\phi'=(4\pi/\lambda)(B \cos(\theta-\alpha)d\theta; \qquad 7.$$

and, $$d\phi'/dz=(4\pi/\lambda)(B \cos(\theta-\alpha)/\rho \sin(\theta). \qquad 8.$$

The derivative of equation (5) with respect to displacement is:

$$d\phi'/d\Delta\rho=(4\pi/\lambda). \qquad 9.$$

Since the distance to, for example, a satellite to the ground $\rho$ 216, as illustrated in FIG. 2, is much larger (e.g., 10s of kilometers) than the distance between antenna positions, which is the baseline B between points $A_1$ 202 and $A_2$ 204, the right hand side of equation (8) is much smaller than that of equation (9). Therefore, the measured phase is much more sensitive to displacement than to topography. Consequently, the radar interferometry is more sensitive to a change in topography with time than it is to the topography itself. As an example, for a wavelength of 5.6 cm (ERS-1 satellite), 1 meter of topography gives a phase signature of 4.3 degrees, while for the same pass pair, a 1 meter surface displacement gives a phse signature of 12,800 degrees (approximately 3000 times more sensitive).

Accordingly, the technique derived above can be used to measure surface displacements down to about a millimeter level.

InSAR Sampling Strategy of the Present Invention
A. (Single Antenna System/Repeat Pass Interferometry for Measuring Dynamic Motions)

Having one antenna requires sampling of target surface displacements (e.g., fast moving surface waves of at least greater than about 100 m/sec, more often between about 300 and about 8,000 m/sec and having an amplitude of at least about 1 cm) that can be produced by, for example, earthquakes, mining and gas line explosions, military explosions, etc., as a transient but assumed stationary (i.e., over the sampling interval during the wave capture pass) perturbation in topography of the imaged region. One pass captures an image of the wave (wave capture pass), and another topographical repeat pass with less than about a 1 degree angle for interferometry collects the unperturbed topography.

Figure 3:
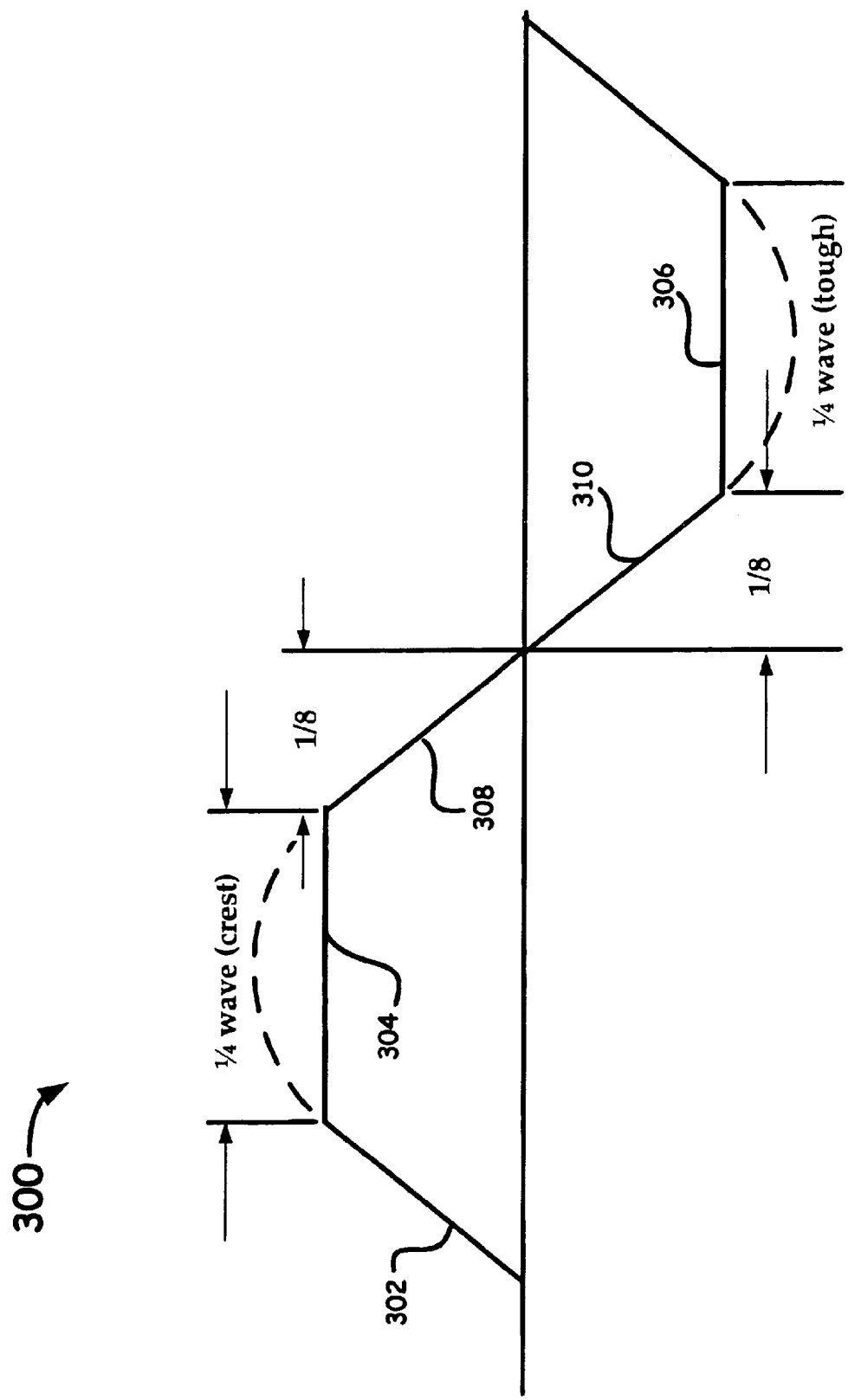
FIG. 3 illustrates a wave sampling schematic.

FIG. 3 illustrates a single antenna repeat-pass mode sampling strategy of the present invention and is generally designated as reference numeral 300. FIG. 3 illustrates that the most optimal portion of a detected wave 302 is the top/crest ¼ region 304 of wave 302 and the bottom/trough ¼ wave region 306 of wave 302, with the combined ¼ wave region 308 and 310 in-between top/crest 304 ¼ region and bottom/trough 306 ¼ wave region averaging to zero. A final reconstructed image appears as sub-fringes associated with such crests and troughs of the waves where the phase difference between passes is directly proportional to the perturbation in the local topography due to surface displacements (e.g., seismic waves) traveling through the field of view. Sampling calculations are based on this ¼ wavelength sampling strategy for imaging surface waves originating from a surface or from an underground source, such as an explosion.

EXAMPLE

Calculated Imaging Parameters:

PRF (Pulse Repetition Frequency)=2×10³ Hz $V_{plat}$ (horizontal SAR platform velocity (satellite))=8×10³ m/sec $V_{plat}$ (horizontal SAR platform velocity (airborne))=220 m/sec $U_{seis}$ (horizontal seismic surface wave velocity)=3×10³ m/sec $f_{seis}$ (frequency of seismic surface wave)=3 Hz $\lambda_{seis}$ (wavelength of seismic surface wave)=1 km $T_{seis}$ (period of seismic surface wave)=0.333 sec/cycle $\Delta t_{PRF}$ (time between each illumination pulse)=0.0005 sec/pulse Therefore, the sampling (i.e., number of output pulses to image) required based on imaging parameters shown above and based on a ¼ wavelength sampling strategy is as follows:

$T_{1/4seis}$ (period of crest or trough)=$T_{seis}$/4=0.08325 sec $T_{1/4seis}/\Delta t_{PRF}$ (# of pulses/¼ wavelength)=166.67 pulses per ¼ wav $V_{plat}*\Delta t_{PRF}$ (platform distance traveled per pulse (satellite))=4 m/pulse $V_{plat}*\Delta t_{PRF}$ (platform distance traveled per pulse (airborne))=0.1 m/pulse Accordingly, The Synthetic Aperture Length for each ¼ wavelength ($SAL_{1/4seis}$) is:

$SAL_{1/4seis}$ (satellite)=(166.67 pulses per ¼ wavelength) *(4 m/pulse)=668.68 m per ¼ wavelength; and $SAL_{1/4seis}$ (airborne)=(166.67 pulses per ¼ wavelength) *(0.1 m/pulse)=18.33 m per ¼ wavelength B. (Dual Channel, Dual Phase Center ATI "Along-Track Interferometer" System/Single-pass ATI Mode)

Having two channel feeds to a single antenna with dual phase centers (or two physically separate antennas) offset along the flight track (azimuth) direction can form an Along-Track Interferometer (ATI) as discussed herein before. An ATI exploits the short time delay between two similarly collected SAR images from dual phase centers spaced in the along-track (azimuth) direction. The radar backscatter received at the two antennas are identical except for a change that occurs in the ground scattering characteristics during a lag time interval ($t_{lag}$), i.e., the time it takes for the trailing (aft) phase center to travel to the position of the leading (forward) phase center. Therefore, a lag time interval for this embodiment is equal to the ratio of a baseline B (the distance between the two phase centers) and a SAR platform velocity ($V_{plat}$), i.e., $t_{lag}$=B/$V_{plat}$. Subtracting the phase between the two images results in a (short) temporal difference occurring during $t_{lag}$ being non-zero.

Accordingly, an ATI is beneficial in imaging dynamic waves. The present invention uses such a technique that is capable of imaging surface waves traveling with a velocity greater than about 50 cm/sec (e.g., water perturbations), however the present invention is beneficial in imaging fast moving surface waves of greater than about 100 m/sec, more often between about 300 m/sec and about 8000 m/sec (i.e., 8 km/sec), utilizing a baseline B, for example, of less than about 100 cm. The phase difference φ between the dual phase centers in the ATI system of the present invention is as follows:

$$\phi=(4\pi B/\lambda)(U_{seis}\sin(<inc.)/V_{plat};\qquad 10.$$

where B is the ATI antenna spacing, $V_{plat}$ is the platform velocity, λ is the radar wavelength, and <inc., is the radar incidence angle. Assuming a radar incidence angle of about 30 degrees and solving for baseline B:

$$B=(\theta\lambda/2\pi)(V_{plat}/U_{seis}).\qquad 11.$$

An interferometric phase ambiguity arises if the phase difference between individual SAR images exceeds π, which requires that the phase difference φ be less than π radians. Accordingly, a beneficial maximum baseline B, can be calculated and implemented into the architecture of the present invention for a given set of imaging parameters so as to not introduce such a phase ambiguity.

EXAMPLE

Calculated Imaging Parameters:

PRF (Pulse Repetition Frequency)=2×10³ Hz $V_{plat}$ (horizontal SAR platform velocity (satellite))=8×10³ m/sec $V_{plat}$ (horizontal SAR platform velocity (airborne))=220 m/sec $U_{seis}$ (horizontal seismic surface wave velocity)=3×10³ m/sec $f_{seis}$ (frequency of seismic surface wave)=3 Hz $\lambda_{seis}$ (wavelength of seismic surface wave)=1 km $T_{seis}$ (period of seismic surface wave)=0.333 sec/cycle $\Delta t_{PRF}$ (time between each illumination pulse)=0.0005 sec/pulse <inc. (radar incidence angle)=30 degrees Therefore, a critical (i.e., a maximum) baseline B, for various radar example wavelengths is as follows:

$B_X$ (X-band; $\lambda_X$=0.03 m)=4.0 cm (Space) and 1.1 mm (airborne vehicle)

$B_C$ (C-band; $\lambda_C$=0.05 m)=6.7 cm (Space) and 1.8 mm (airborne vehicle)

$B_L$ (L-band; $\lambda_L$=0.24 m)=32.0 cm (Space) and 8.8 mm (airborne vehicle)

$B_P$ (P-band; $\lambda_P$=0.69 m)=92 cm (Space) and 25.3 mm (airborne vehicle)

Figure 4:
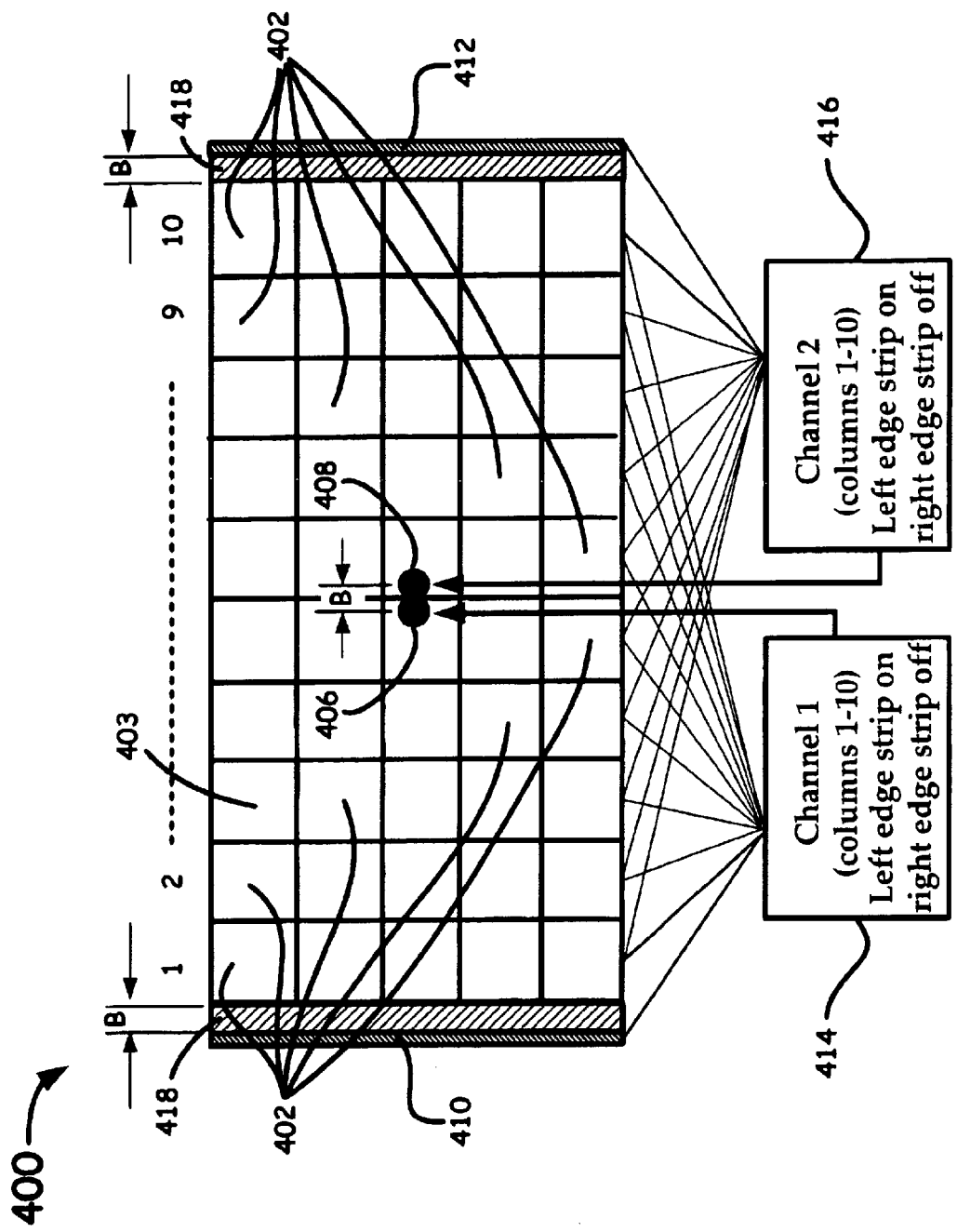
FIG. 4 illustrates a single antenna design having offset dual-phase centers routed to dual receivers.

FIG. 4 shows an exemplary dual-phase-center antenna of the present invention, designated as reference numeral 400, having columns 402 of antenna elements 403. Such an antenna 400 also includes two independent phase centers 406, 408, created electronically by alternating on and off outer edge conducting strips 410, 412, controlled and fed by two separate receiver channels 414, 416. For left phase center 406 (controlled by receiver channel 1, 414) to be active, left edge conducting strip 410 is on and right edge conducting strip 412 is off. For right phase center 408

(controlled by receiver channel 2, 416) to be active, left edge conducting strip 410 is off and right edge conducting strip 412 is on. The necessary phase center offset is determined from equation (11), as shown above, in addition to the SAR center frequency wavelength, the velocities of the antenna platform (aircraft or satellite), and the velocity of the fast-moving wave being imaged. Such a phase center offset is equal to the required ATI baseline, denoted as the letter B 418 for a given wavelength SAR configuration.

Accordingly, a series of phase differential maps (interferograms) by the method and system of the present invention is obtained by imaging a plurality of intereferometric phase differences along a synthetic aperture in either a repeat-pass single-antenna (static) mode or a single-pass (dynamic) mode, i.e., single-antenna dual-phase receiver or having dual physically separate antennas). Such a method and system is capable of measuring natural (e.g., earthquakes, Tsunamis, etc.) or man-made (surface and underground explosions) surface displacements having wave velocities greater than about 100 m/sec. For example, as stated herein before, earthquake rupture physics, volcano harmonic tremor source characterization, open ocean tsunami tracking and early warnings are just some of the applications that the present invention is capable of addressing. For all such applications, the precision of the individual phase measurements can be improved by increasing the illumination microwave power utilized in the present invention and, thereby, the detection Signal to Noise Ratio (SNR).

The Dynamic InSAR imaging method described herein can additionally assess damage to an underground cavity or structure (target) from an exploding ordinance (i.e., battle damage assessment, or BDA). Such a method can image the concentric rings associated with the dynamic seismic surface waves (i.e., rings of surface displacement or disturbance) as they propagate outward from an explosive, earth-penetrater-type ordinance directed at a target (analogous to the concentric ripples in a pond propagating outward from a stone or other object thrown into the pond).

Accordingly, three dynamic InSAR imaging results are possible that correspond to three different phenomenological outcomes from the exploding earth-penetrator ordinance. The first possible outcome is that the energy from the ordinance does not sufficiently mechanically couple into the ground to generate seismic waves outward from the point of impact of the ordinance. In this case, most of the energy has simply "bounced off" the target and can be assumed to not have caused damage to the underground target.

In the second case, the earth-penetrator does sufficiently mechanically couple into the ground and produces seismic surface waves propagating outward from the point of impact of the ordinance. However, there is no secondary set of concentric waves propagating outward from the underground target due to a secondary moment release that is generated from a partial or complete collapse of the underground target. In this case, the underground cavity or structure is assumed to have not been significantly damaged as evidenced by the absence of a secondary set of concentric waves (rings) propagating outward from the target that can otherwise suggest a partial or complete collapse of the underground cavity or structure.

The third case is when two, possibly displaced, sets of concentric seismic surface waves are observed; one from the exploding earth-penetrator ordinance generating seismic waves, and the other from the secondary moment release from partial or complete collapse of the underground structure or cavity generating a second, delayed in time, set of concentric seismic waves. Computer simulations of seismic source and wave propagation scenarios such as the ones described here have been designed and executed by the inventor and show that the secondary seismic moment release can be several (between about one and about ten) times the seismic moment release from the earth-penetrator alone, which illustrates the BDA discrimination capability afforded by the application of this technique.

The Dynamic InSAR imaging methodology described here can also be used to both detect, locate, and determine the gross geometry of an unknown underground cavity or structure as follows. If an earth-penetrator-type ordinance is detonated near an unknown underground cavity or structure, and the ordinance sufficiently couples mechanically into the ground to generate seismic surface waves (i.e., concentric rings of surface disturbance and or displacement), an underground cavity or structure can generate a visible seismic wave shadow on the leeward (far) side of the ordinance impact/explosion point, and can create diffuse reflections in the windward (near) side of the ordinance impact/explosion point. This effect is analogous to the effect that a floating stick or log has on ripples propagating outward from the impact point of rock thrown into the pond. Computer simulations of seismic source and wave propagation scenarios such as the one described here have been designed and executed by the inventor and show that both leeward shadows and windward reflections do in fact occur as a result of a perturbation of the earth-penetrator-generated wave field. Furthermore, the gross size and shape of the underground cavity can be determined by the size and shape of the wavefield shadow and reflection created henceforth by the underground cavity or structure.

The tactical military deployment scenario of such Dynamic InSAR system applicable to BDA and underground target identification can be a moving aircraft, such as, a fighter plane with such an imaging system on board, viewing an attack on an enemy target area and providing real-time feedback of the BDA or detection and location of an unknown underground target as described above. An exemplary application is to augment existing moving target indicator (MTI) SAR system displays onboard to have this seismic wave imaging and discriminatory capability. For example, instead of simply having a Doppler image showing green dots on a cockpit display showing man-made moving targets with their respective velocities, such a display can also provide visible green concentric circles indicating the information described above for BDA and underground target identification.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A Dynamic InSAR imaging method, comprising:
sampling one or more fast-moving surface displacement waves from a plurality of moving platform positions utilizing a plurality of pulses from an electromagnetic radiation source and at least one antenna; and
reconstructing a plurality of phase differentials from said plurality of platform positions to produce a series of interferometric images of said waves.

2. The method of claim 1, wherein said fast-moving surface displacement waves comprise waves having a traveling velocity greater than about 100 m/sec.

3. The method of claim 1, wherein said fast-moving surface displacement waves comprise waves having a traveling velocity between about 300 m/sec and about 8000 m/sec.

4. The method of claim 1, wherein said sampling further comprises sampling the ¼ crests and the ¼ troughs of said waves.

5. The method of claim 1, wherein said waves have an amplitude of at least about 1 cm.

6. The method of claim 5, wherein said source produces X-band microwaves.

7. The method of claim 1, wherein said electromagnetic radiation source produces microwaves having a wavelength between about 1 mm and about 1 m.

8. The method of claim 1, wherein said moving platform comprises an airborne platform.

9. The method of claim 8, wherein said airborne platform comprises a jet aircraft.

10. The method of claim 1, wherein said moving platform comprises a satellite.

11. The method of claim 1, further comprising a dual-phase-center antenna.

12. The method of claim 1, further comprising a pair of physically separate antennas.

13. The method of claim 1, wherein said method includes along-track InSAR.

14. The method of claim 1, wherein said method includes repeat-pass InSAR.

15. The method of claim 1, where said method includes strip-mode InSAR.

16. The method of claim 1, wherein said method includes spotlight InSAR.

17. A Dynamic InSAR imaging method, comprising:
sampling one or more fast-moving surface displacement waves from a plurality of moving platform positions utilizing a plurality of pulses from an electromagnetic radiation source and at least one antenna,
producing an offset phase center having a time lag $t_{lag}$,
subtracting a phase difference having said time lag $t_{lag}$ to produce a phase differential at each of said platform positions; and
reconstructing a plurality of said phase differentials to produce a series of interferometric images of said fast-moving surface displacement waves.

18. The method of claim 17, wherein said fast-moving surface displacement waves comprise waves having a traveling velocity greater than about 100 m/sec.

19. The method of claim 17, wherein said fast-moving surface displacement waves comprise waves having a traveling velocity between about 300 m/sec and about 8000 m/sec.

20. The method of claim 17, wherein said sampling further comprises sampling the ¼ crests and the ¼ troughs of said waves.

21. The method of claim 17, wherein said waves have an amplitude of at least about 1 cm.

22. The method of claim 17, wherein said time lag $t_{lag}$ comprises the time it takes for a trailing, aft, phase center to travel to a position of a leading, forward, phase center, with $t_{lag}=B/V_{plat}$, where B is the distance between said aft and said forward phase centers and $V_{plat}$ is said platform velocity.

23. The method of claim 17, wherein said electromagnetic radiation source produces microwaves having wavelengths between about 1 mm and about 1 m.

24. The method of claim 23, wherein said source produces X-band microwaves.

25. The method of claim 17, wherein said moving platform comprises an airborne platform.

26. The method of claim 25, wherein said airborne platform comprises a jet aircraft.

27. The method of claim 17, wherein said moving platform comprises a satellite.

28. The method of claim 17, further comprising:
shifting a receive array by at least one column between a pair of receive channels to produce said offset phase center.

29. The method of claim 17, further comprising:
turning on and off predetermined one or more outer conductor strips to produce said offset phase center.

30. A Dynamic InSAR imaging method, comprising:
sampling one or more fast-moving surface displacement waves from a plurality of moving platform positions utilizing a plurality of pulses from an electromagnetic radiation source and at least one antenna,
producing an offset phase center having a time lag $t_{lag}$,
subtracting a phase difference having said time lag $t_{lag}$ to produce a phase differential at each of said platform positions,
reconstructing a plurality of said phase differentials to produce a series of interferometric images having one or more sets of concentric rings associated with said fast-moving surface displacement waves.

31. The method of claim 30, wherein said concentric rings includes one or more primary sets of concentric rings.

32. The method of claim 30, wherein said concentric rings includes one or more primary concentric rings and one or more secondary sets of concentric rings.

33. The method of claim 30, wherein said concentric rings includes one or more displaced sets of concentric rings.

34. The method of claim 30, wherein said concentric rings include wave shadows.

35. The method of claim 30, wherein said concentric rings include diffuse reflections.

36. The method of claim 30, wherein said fast-moving surface displacement waves comprise waves having a traveling velocity greater than about 100 m/sec.

37. The method of claim 30, wherein said fast-moving surface displacement waves comprise waves having a traveling velocity between about 300 m/sec and about 8000 m/sec.

38. The method of claim 30, wherein said sampling further comprises sampling the ¼ crests and the ¼ troughs of said waves.

39. The method of claim 30, wherein said waves have an amplitude of at least about 1 cm.

40. The method of claim 30, wherein said time lag $t_{lag}$ comprises the time it takes for a trailing, aft, phase center to travel to a position of a leading, forward, phase center, with $t_{lag}=B/V_{plat}$, where B is the distance between said aft and said forward phase centers and $V_{plat}$ is said platform velocity.

41. A dual-phase-center InSAR apparatus, comprising:
a receive array capable of collecting a reflected radiation from an electromagnetic source,
a first channel receiver adapted to measure said reflected radiation collected from said array and;
a second channel receiver additionally adapted to measure said reflected radiation collected from said array, said first and said second channel receivers being further adapted to produce a predetermined phase center offset (B), with B being a predetermined baseline distance between an aft and a forward phase center, wherein a phase difference between said aft and said forward phase center enables the determination of a wave velocity of one or more fast-moving surface displacement waves.

42. The apparatus of claim 41, wherein said phase center offset includes shifting said receive array by a column between said first and said second channel receivers to produce said baseline B, with $B=(\theta\lambda/2\pi)(V_{plat}/U_{seis})$.

43. The apparatus of claim 41, wherein said phase center offset includes turning on and off one or more conductor strips arranged on said receive array to produce said baseline B, with $B=(\theta\lambda/2\pi)(V_{plat}/U_{seis})$.

* * * * *